3,334,144
PROCESS FOR MAKING ALKYLTRIARYL-
PHOSPHONIUM COMPOUNDS
Daniel W. Grisley, Jr., Lexington, Mass., assignor to Monsanto Research Corporation, St. Louis, Mo., a corporation of Delaware
No Drawing. Filed July 21, 1964, Ser. No. 384,260
6 Claims. (Cl. 260—606.5)

This invention relates to a process for making phosphonium compounds, and more particularly, provides a novel process for making alkyltriarylphosphonium bromides.

Phosphonium compounds can be prepared by heating a trisubstituted phosphine with an alkyl halide. The preparation of methyltriphenylphosphonium bromide, for example, is accomplished in accordance with this method by heating triphenylphosphine with methyl bromide, usually in a solvent such as benzene. The stated reaction, while proceeding relatively straightforwardly, has the disadvantage that it must be conducted in a pressure vessel. The boiling point of methyl bromide is 2° C. and temperatures of 50° C. or above are required for any reasonable reaction rate. The manipulative difficulties of handling reactions in pressure vessels such as autoclaves make this procedure inconvenient.

It is an object of this invention to provide an improved method for making phosphonium halides.

A particular object of this invention is to provide an improved method of making alkyltriarylphosphonium bromides, and particularly, methyltriphenylphosphonium bromide.

These and other objects will become evident upon consideration of the following specification and claims.

It has now been found that when the reaction of a triarylphosphine with a 1,1-dibromoalkane is conducted in an alcoholic solvent, the reaction product is an alkyltriarylphosphonium bromide, of the formula:

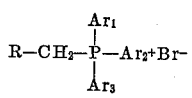

where each Ar (each of Ar$_1$, Ar$_2$ and Ar$_3$) represents an aryl radical, and R is a substituent selected from H and hydrocarbon radicals, as further defined hereinafter.

In other, aprotic solvents, such as aromatic solvents like diethylbenzene, toluene, tricresyl phosphate and the like, the reaction of a triarylphosphine with a 1,1-dibromoalkane such as dibromomethane proceeds to form compounds in which both bromine atoms are retained in the resulting phosphorus compound, as illustrated by the equation:

3(Ar)$_3$P + 2CH$_2$Br$_2$ ⟶

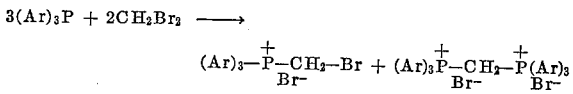

where Ar represents an aryl radical.

However, it has now unexpectedly been found that the reaction of triarylphosphines with a 1,1-dibromoalkane such as dibromomethane in proton donor solvents like alcohols results in a halogen exchange, whereby one of the halogen atoms on the terminal carbon atom is replaced by hydrogen. A byproduct of the reaction is triphenylphosphine oxide, which indicates that the alcoholic solvent is probably involved in the reaction, presumably acting as a source of the oxygen atom in the triphenylphosphine oxide. Very probably the alcohol is also the source of the hydrogen atom acquired as a replacement of bromine in the alkyl group of the resulting phosphine compound.

Thus the present reaction may be illustrated by the equation

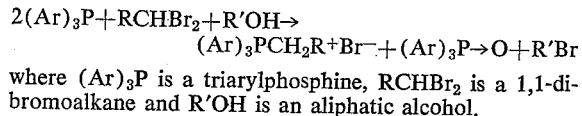

where (Ar)$_3$P is a triarylphosphine, RCHBr$_2$ is a 1,1-dibromoalkane and R'OH is an aliphatic alcohol.

Preparation of alkyltriarylphosphonium bromides by the present method is convenient to carry out: the reflux temperatures of alcoholic solutions of the phosphine and dibromoalkane are usually suitable for carrying out the reaction, and pressure vessels are not required. Also, yields of the phosphonium products are advantageously high, amounting to better than 90% in some cases.

In conducting the present process for the preparation of alkyltriarylphosphonium bromides, the triarylphosphines employed as starting materials may include, for example, trihydrocarbyl phosphines such as triphenylphosphine, tri-o-tolylphosphine, tri-m-tolylphosphine, tri-p-tolylphosphine, tri-2,4-xylylphosphine, tri-2,5-xylylphosphine, tri(2,4,5 - trimethylphenyl)phosphine, tri - alpha-naphthylphosphine, tri - p - biphenylylphosphine, di-phenyl - p - tolyl - phosphine, phenyl - di - p - tolylphosphine, and the like. In general the presently contemplated triarylphosphines have from 6 to 12 carbon atoms in each aryl radical, and each such radical is a radical containing a benzene ring attached by a ring carbon atom to the phosphorus atom. Further, the triarylphosphines susceptible to the process of the present invention include triarylphosphines in which a phenyl or condensed benzene ring attached to the phosphorus atom carries inert non-interfering substituents such as chlorine or fluorine, alkoxy, phenoxy, dialkylamino and the like, in which the alkyl radicals are lower alkyl hydrocarbon radicals of from 1 to 6 carbon atoms. Thus, further exemplary of the presently contemplated phosphine reactants are tris(o-chlorophenyl)phosphine,
tris(m-chlorophenyl)phosphine,
tris(p-chlorophenyl)phosphine,
tris(m-methoxyphenyl)phosphine,
tris(p-phenoxyphenyl)phosphine,
tris(p-dimethylaminophenyl)phosphine,
tris(p-diethylaminophenyl)phosphine,
diphenyl(p-chlorophenyl)phosphine,
diphenyl(4-methoxyphenyl)phosphine,
diphenyl(p-fluorophenyl)phosphine,
diphenyl(p-dimethylaminophenyl)phosphine,
di-p-tolyl(p-methoxyphenyl)phosphine,
phenyl(p-bromophenyl)(p-methoxyphenyl)phosphine,
phenyl(p-chlorophenyl)(p-dimethylamino)phosphine,
phenyl(p-methoxyphenyl)-p-tolylphosphine, and the like.

In general, then the presently contemplated triarylphosphines are represented by the formula

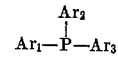

in which each Ar (each of Ar$_1$, Ar$_2$ and Ar$_3$) is an aryl radical of from 6 to 12 carbon atoms, containing a benzene ring attached by a ring carbon atom to the phosphorus atom and having inert substituents selected from hydrogen, alkyl, alkoxy, dialkylamino, phenoxy, chlorine and fluorine, in which the alkyl radicals are lower saturated alkyl hydrocarbon radicals of up to 6 C atoms. Trihydrocarbylphosphines are preferred.

The presently useful 1,1-dibromoalkanes are compounds of the formula

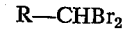

where R is selected from the group consisting of H and hydrocarbon radicals free of aliphatic unsaturation and containing up to 9 carbon atoms. Dibromomethane is a preferred 1,1-dibromoalkane; other useful aliphatic 1,1-dibromoalkanes include, for example, 1,1-dibromomethane, 1,1-dibromopropane, 1,1-dibromo-n-butane, 1,1-dibromoisobutane, 1,1-dibromo-n-pentane, 1,1-dibromo-n-hexane, 1,1-dibromo-2,4,4-trimethylhexane, and so forth. While the terminal, bromine-substituted carbon atom of the presently useful 1,1-dibromoalkanes must be aliphatic, the carbon atoms of the dibromoalkane nucleus may include a phenyl or alkylphenyl group as a substituent. Thus, further illustrative of the presently contemplated 1,1-dibromoalkanes are benzal bromide

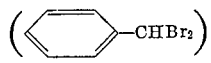

1,1 - dibromo - 2 - phenylethane, 1,1 - dibromo - 2 - p - tolylethane, 1,1 - dibromo - 3 - phenylpropane, dibromo-(isopropylphenyl)methane, and so forth.

The alkyltriarylphosphonium bromides preparable by the present process thus include, for example methyltriphenylphosphonium bromide,
ethyltriphenylphosphonium bromide,
methyltri-p-tolylphosphonium bromide,
methyltri-2,4-xylylphosphonium bromide,
butyltriphenylphosphonium bromide,
benzyltriphenylphosphonium bromide,
benzyltribiphenylylphosphonium bromide,
benzyldiphenyl-p-tolylphosphonium bromide,
methyltrinaphthylphosphonium bromide,
methyltris(p-chlorophenyl)phosphonium bromide,
methyltris(m-methoxyphenyl)phosphonium bromide,
benzyltris(p-dimethylaminophenyl)phosphonium
  bromide,
octyltris(p-fluorophenyl)phosphonium bromide,
butyltris(p-chlorophenyl)phosphonium bromide,
methyldiphenyl-p-tolylphosphonium bromide, and so forth.

The alcoholic solvents which may be employed as solvent-reactants in the process of this invention are alkyl alcohols in which a saturated aliphatic hydrocarbon radical of from 1 to 6 carbon atoms is attached to a hydroxy group (of the formula R'OH, in which R' is a saturated aliphatic hydrocarbon radical of up to 6 C atoms). These include primary, secondary and tertiary alcohols such as methanol, ethanol, propanol, isopropanol, butanol, t-butanol, isobutanol, the amyl alcohols, and the hexyl alcohols. Primary alcohols are preferred and methyl alcohol is especially preferred.

In carrying out the present method for the production of an alkyltriarylphosphonium bromide, the triarylphosphine will be contacted with the 1,1-dibromoalkane in solution in the alcoholic solvent. In general, the amounts of the triarylphosphine, 1,1-dibromoalkane and the alcoholic solvent are not critical. The reaction proceeds by a mechanism forming a triarylphosphine oxide as a byproduct, and accordingly, to avoid exhaustion of the phosphine reactant prior to complete consumption of the dibromoalkane reactant, it is advisable for the triarylphosphine to be present in excess. Thus, the molar ratio of triarylphosphine to dibromoalkane is preferably above about 3 to 1. This ratio may range up to, say, 10 moles of the triarylphosphine per mole of the dibromoalkane. It may, indeed, be as low as 1 mole of the triarylphosphine per mole of the dibromoalkane or less if desired, where high conversions are not important. Usually at least about one mole of the alcoholic solvent per mole of the triarylphosphine reactant will be employed in preparing the reaction mixture, and the amount of this alcoholic solvent employed will in any case be at least about 1 mole per mole of the dibromoalkane. Usually it will be desirable to employ much more than the stated amounts of the alcohol, to provide a satisfactorily fluid reaction mixture. Thus, twenty moles of the alcoholic solvent per mole of the triarylphosphine reactant may be employed, or even more.

The triarylphosphine, dibromoalkane, and the alcoholic solvent will be contacted at temperatures and for contact times sufficient to effect conversion of the triarylphosphine to the phosphonium compound. Temperatures employed in the connection may vary from below room temperature up to any temperature below that producing decomposition of the reaction mixture components. At the temperature of a refluxing methanol solution, which is about 60–70° C., the reaction proceeds relatively slowly; it requires 24 hours to produce 30% conversion of triphenylphosphine to methyltriphenylphosphonium bromide, for example. It is usually desirable to heat the reaction mixture, suitably to reflux temperatures, which are generally temperatures in the range of 50–150° C. Atmospheric pressures are usually suitable and as noted hereinabove it is particularly convenient to conduct this reaction at ordinary atmospheric pressures, as compared to prior art superatmospheric pressure vessel techniques.

Formation of the desired alkyltriarylphosphonium bromide can be followed, if desired, by monitoring the formation of the triarylphosphine oxide in the reaction mixture. To recover the alkyltriarylphosphonium bromide from the reaction mixture, usual separation and isolation procedures such as distillation, extraction, evaporation and the like may be employed.

The invention is illustrated but not limited by the following examples.

*Example 1*

A mixture of 1600 parts (by weight) of triphenylphosphine, 350 parts of dibromomethane and 4000 parts of anhydrous methanol is refluxed for 24 hours, under nitrogen. The reaction mixture is cooled to room temperature (70–75° F.) and filtered. The filtrate is evaporated down at 50° C. under a vacuum of 20 mm. Hg, to provide a syrup. Addition of 18,000 parts by weight of benzene to the syrup produces separation of a solid which is filtered off and recovered. The identity of this solid, M. 224–226° C., as methyltriphenylphosphonium bromide is confirmed by comparison of its infrared spectrum with an authentic sample. Triphenylphosphine recovered from the reaction mixture (1000 parts by weight) indicates a 30% conversion, so that the 430 parts by weight of methyltriphenylphosphonium bromide produced represent a 90% yield on the triphenylphosphine converted.

*Example 2*

The procedure of Example 1 is repeated, substituting 500 parts of $C_6H_5CHBr_2$ for the dibromomethane. The product is benzyltriphenylphosphonium bromide.

*Example 3*

The procedure of Example 1 is repeated, substituting 2130 parts by weight of tris(p-chlorophenyl)phosphine for the triphenylphosphine. The product is methyltris(p-chlorophenyl)phosphonium bromide.

When tris(methoxyphenyl)phosphine is substituted for triphenylphosphine in the procedure of Example 1, the product is methyltris(methoxyphenyl) phosphonium bromide.

While the invention has been described with particular reference to specific preferred embodiments thereof, it will be appreciated that modifications and variations can be made without departing from the scope of the invention as disclosed herein, which is limited only as indicated in the following claims.

What is claimed is:

1. The method of producing alkyltriarylphosphonium bromides which comprises heating a triarylphosphine with a 1,1-dibromoalkane in an alcoholic solvent.

2. The method of producing an alkyltriarylphosphonium bromide which comprises heating a 1,1-dibromoalkane of the formula $RCHBr_2$ in which R is selected from the group consisting of H and hydrocarbon radicals free of aliphatic unsaturation containing up to 9 carbon atoms, with a trihydrocarbylphosphine having 6 to 12 carbon atoms in each hydrocarbon radical, in which each hydrocarbon radical is an aromatic hydrocarbon radical containing a benzene ring attached by a ring carbon atom to the phosphorus atom, in solution in an alcohol consisting of a saturated aliphatic hydrocarbon radical of from 1 to 6 carbon atoms attached to the hydroxy group of said alcohol.

3. The method of producing methyltriphenylphosphonium bromide which comprises heating triphenylphosphine with dibromomethane in solution in an alcohol consisting of a saturated aliphatic hydrocarbon radical of from 1 to 6 carbon atoms attached to the hydroxy group of said alcohol.

4. The method of producing methyltriphenylphosphonium bromide which comprises heating triphenylphosphine with dibromomethane in methanol.

5. The method of producing benzyltriphenylphosphonium bromide which comprises heating triphenylphosphine with benzal dibromide in solution in an alcohol consisting of a saturated aliphatic hydrocarbon radical of from 1 to 6 carbon atoms attached to the hydroxy group of said alcohol.

6. The method of producing benzyltriphenylphosphonium bromide which comprises heating triphenylphosphine with benzal dibromide in methanol.

References Cited
UNITED STATES PATENTS

| | | | |
|---|---|---|---|
| 2,867,665 | 6/1959 | Dornfeld | 260—606.5 |
| 3,098,878 | 7/1963 | Harris et al. | 260—606.5 |

TOBIAS E. LEVOW, *Primary Examiner.*

W. F. W. BELLAMY, *Assistant Examiner.*